(12) United States Patent
Kanda (10) Patent No.: US 11,881,013 B2
(45) Date of Patent: Jan. 23, 2024

(54) VIDEO SYSTEM

(71) Applicant: HITACHI KOKUSAI ELECTRIC INC., Tokyo (JP)

(72) Inventor: Takaomi Kanda, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 333 days.

(21) Appl. No.: 17/438,913

(22) PCT Filed: Mar. 20, 2019

(86) PCT No.: PCT/JP2019/011736
§ 371 (c)(1),
(2) Date: Sep. 13, 2021

(87) PCT Pub. No.: WO2020/188794
PCT Pub. Date: Sep. 24, 2020

(65) Prior Publication Data
US 2022/0189152 A1    Jun. 16, 2022

(51) Int. Cl.
*G06K 9/00* (2022.01)
*G06V 10/82* (2022.01)
*G06N 3/04* (2023.01)

(52) U.S. Cl.
CPC ............. *G06V 10/82* (2022.01); *G06N 3/04* (2013.01)

(58) Field of Classification Search
CPC ...... G06V 10/82; G06V 2201/06; G06N 3/04; G06N 3/045; G06N 3/048; G06N 3/08; G06T 7/00
See application file for complete search history.

(56) References Cited

U.S. PATENT DOCUMENTS

| 5,884,296 A | 3/1999 | Nakamura et al. |
| 2016/0139977 A1* | 5/2016 | Ashani ............... G06F 11/0706 714/26 |

(Continued)

FOREIGN PATENT DOCUMENTS

| JP | 8-251404 A | 9/1996 |
| WO | 2017/187516 A1 | 11/2017 |

OTHER PUBLICATIONS

Zhu, Xizhou, et al. "Deep Feature Flow for Video Recognition." 2016. (Year: 2016).*

(Continued)

*Primary Examiner* — Andrew M Moyer
(74) *Attorney, Agent, or Firm* — Procopio, Cory, Hargreaves & Savitch LLP (57) ABSTRACT

A system configuration suitable for carrying out video recognition by machine learning in a video system including an imaging device and a video processing device is provided.

One aspect of the video system according to the present invention includes an imaging device and a video processing device. The imaging device includes an imaging unit configured to generate video data by imaging, a front side NN unit including multiple layers of neural networks from an input layer to a predetermined intermediate hidden layer (hereinafter referred to as "intermediate hidden layer") that are configured to perform recognition processing of the video data; and an imaging side control unit configured to transmit an output of the intermediate hidden layer of the front side NN unit (hereinafter referred to as "intermediate feature quantity"). The video processing device includes a video processing side control unit configured to acquire the intermediate feature quantity transmitted from the imaging side control unit, and a rear side NN unit including the multiple layers of the neural networks from a layer subse- (Continued)

quent the intermediate hidden layer to an output layer, the rear side NN unit configured to perform the remaining recognition processing regarding the intermediate feature quantity acquired by the video processing side control unit.

20 Claims, 8 Drawing Sheets

(56) References Cited

U.S. PATENT DOCUMENTS

| | | | |
|---|---|---|---|
| 2018/0260687 A1* | 9/2018 | Kanno | G06N 3/045 |
| 2019/0050714 A1* | 2/2019 | Nosko | G06N 3/082 |
| 2019/0156157 A1* | 5/2019 | Saito | G06F 18/217 |

OTHER PUBLICATIONS

International Search Report dated May 28, 2019, issued in counterpart International Application No. PCT/JP2019/011736, w/ English Translation.

* cited by examiner

FIG. 1

FIG. 3   OPERATION OF VIDEO PROCESSING DEVICE

VIDEO SYSTEM

I. TECHNICAL FIELD

The present invention relates to a video system, an imaging device, and a video processing device.

II. BACKGROUND ART

Hitherto, in the field of video recognition/identification, a configuration has been known in which video data that has been output from an imaging device is processed by a computer or via cloud computing.

In recent years, performing video recognition/identification of video data output from the imaging device using machine learning techniques such as DNNs (Deep Neutral Networks) and CNNs (Convolution Neural Networks) in computers or via cloud computing has been suggested.

Paragraphs 0104 to 0108 and FIG. 14 of PTL 1 discloses processing a video output from an imaging device (camera) by two DNNs, which are "first hierarchy machine learning/recognizing device DNN1, and second hierarchy machine learning/recognizing device DNN2", serving as video processing devices externally connected to the camera.

III. CITATION LIST

Patent Literature

[PTL 1] WO 2017/187516

IV. SUMMARY OF INVENTION

Technical Problem

According to the technique disclosed in PTL 1, the video obtained by the "imaging device" is processed by both "the first hierarchy machine learning/recognizing device DNN1" and "the second hierarchy machine learning/recognizing device DNN2". Due to the characteristic feature of the technique, it is necessary to construct a DNN that provides a certain level of accuracy by "the first hierarchy machine learning/recognizing device DNN1" alone on the terminal side, and the output of an intermediate layer thereof must express information for deeper learning to be performed by "the second hierarchy machine learning/recognizing device DNN2", so that the configuration becomes complex and extensive.

Further, since the output of the intermediate layer determined arbitrarily by "the first hierarchy machine learning/recognizing device DNN1" is entered as an input to "the second hierarchy machine learning/recognizing device DNN2", it is not easy to change the position of the intermediate layer after learning is performed by "the second hierarchy machine learning/recognizing device DNN2", and when it becomes necessary to change the configuration due to the surrounding environment or external factors, relearning of the DNN is required.

The present invention aims at providing a system configuration that is suitable for carrying out video recognition by machine learning in a video system including an imaging device and a video processing device.

V. MEANS FOR SOLVING THE PROBLEM

In order to solve the problems described above, one typical example of a video system according to the present invention includes an imaging device and a video processing device.

The imaging device includes an imaging unit that generates video data by imaging, a front side NN unit including multiple layers of neural networks from an input layer to a predetermined intermediate hidden layer (hereinafter referred to as "intermediate hidden layer") that perform recognition processing of the video data, and an imaging side control unit that transmits an output of the intermediate hidden layer of the front side NN unit (hereinafter referred to as "intermediate feature quantity").

The video processing device includes a video processing side control unit that acquires the intermediate feature quantity transmitted from the imaging side control unit, and a rear side NN unit including the multiple layers of the neural networks from a layer subsequent the intermediate hidden layer to an output layer, the rear side NN unit performing the remaining recognition processing regarding the intermediate feature quantity acquired by the video processing side control unit.

VI. ADVANTAGEOUS EFFECTS OF INVENTION

The present invention provides a system configuration suitable for carrying out video recognition by machine learning in a video system including an imaging device and a video processing device.

Problems, configurations and effects other than those described above will become clear in the following description of embodiments.

VIII. DESCRIPTION OF EMBODIMENTS

Now, preferred embodiments will be described with reference to the drawings.

First Embodiment (Configuration of First Embodiment)

Figure 1:
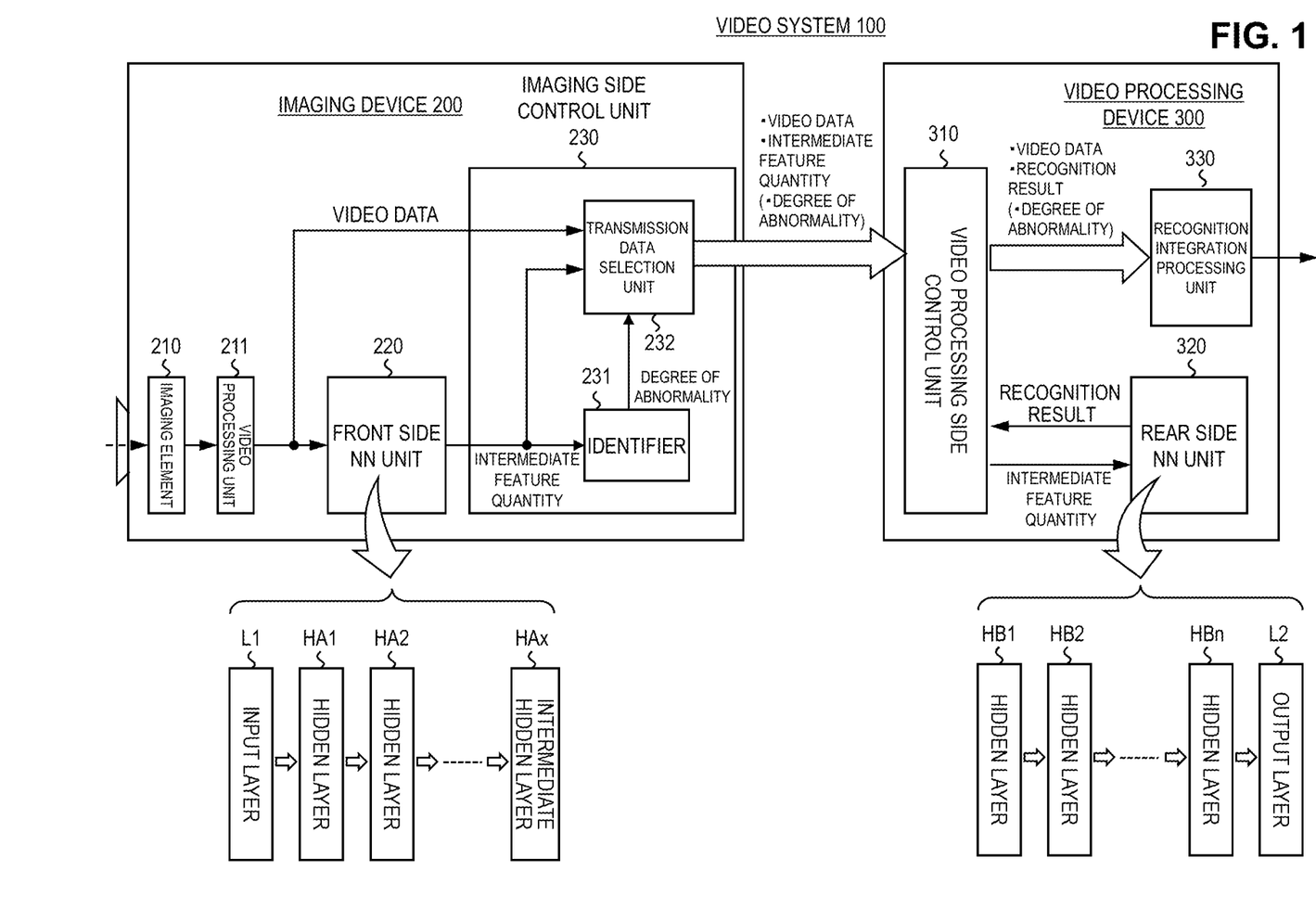
FIG. 1 is a block diagram illustrating a configuration of a video system according to a first embodiment.

FIG. 1 is a block diagram illustrating a configuration of a video system according to a first embodiment.

In the drawing, a video system 100 includes an imaging device 200 and a video processing device 300.

The imaging device 200 includes an imaging element 210 for imaging objects for inspection or monitoring, a video processing unit 211 for performing video processing such as gamma correction, color correction, contour correction, or white blemish correction to the output of the imaging element 210 and generating a video data, a front side NN unit 220 for processing the video data and outputting an intermediate feature quantity, and an imaging side control unit 230 for processing the video data and the intermediate feature quantity and generating information to be transmitted to the video processing device 300.

The front side NN unit 220 includes an input layer L1 of the multiple layers of neural networks performing recognition processing of video data, and hidden layers from a first hidden layer HA1 to a predetermined intermediate hidden layer (hereinafter referred to as "intermediate hidden layer HAx"). The intermediate hidden layer HAx outputs multiple node values as intermediate feature quantity serving as an intermediate stage output of the neural networks. The front side NN unit 220 is composed, for example, of FPGA (Field-Programmable Gate Array) or PLD (Programmable Logic Device).

The imaging side control unit 230 includes an identifier 231 that outputs a degree of abnormality according to the intermediate feature quantity, and a transmission data selection unit 232 that selects data (such as video data, intermediate feature quantity and degree of abnormality) to be transmitted to the video processing device 300 in response to the degree of abnormality.

A well-known identification method such as a method for statistically detecting an abnormal value based on Mahalanobis distance or an identifier adopting a support vector machine for one to a few classes can be adopted as the identifier 231.

However, since the identifier 231 is loaded on the imaging device 200, it is preferable to adopt an identifier (learning system) whose amount of calculation matches the processing capacity of the imaging device 200, and therefore, principal component analysis or Fischer's discrimination analysis can be used as a dimensional compression method.

Further, in consideration of a case where the number of layers of the front side NN unit 220 is changed through node allocation described later, it is preferable to prepare condition parameters of identification processing for outputting the degree of abnormality in a replaceable manner for each feature quantity of the hidden layers having a possibility of being set as the intermediate hidden layer HAx.

Meanwhile, the video processing device 300 includes a video processing side control unit 310 that acquires data sent from the imaging device 200, a rear side NN unit 320 that processes the intermediate feature quantity and outputs a recognition result, and a recognition integration processing unit 330 that integrates the result of recognition processing within the video processing device 300 and outputs the same to the exterior.

The rear side NN unit 320 includes one or more layers of hidden layers HB1 to HBn that perform subsequent recognition processing of the intermediate feature quantity as layers succeeding the intermediate hidden layer HAx in the multiple layers of neural networks that perform recognition processing of video data, and an output layer L2 that outputs the processed recognition result.

The video processing device 300 is configured as a computer system that includes a CPU (Central Processing Unit) and a memory as hardware. Various functions of the video processing device 300 are realized by the hardware executing programs. A part of or all the hardware can be replaced with a dedicated device, a general-purpose machine learning device, a DSP (Digital Signal Processor), an FPGA, a GPU (Graphics Processing Unit), a PLD and so on. Further, a part of or all the hardware can be realized in a cloud arrangement by being centralized in a server or dispersed through the network, so that a plurality of video systems can share use of the hardware through the network.

(Operation of Imaging Device 200 According to First Embodiment)

Figure 2:
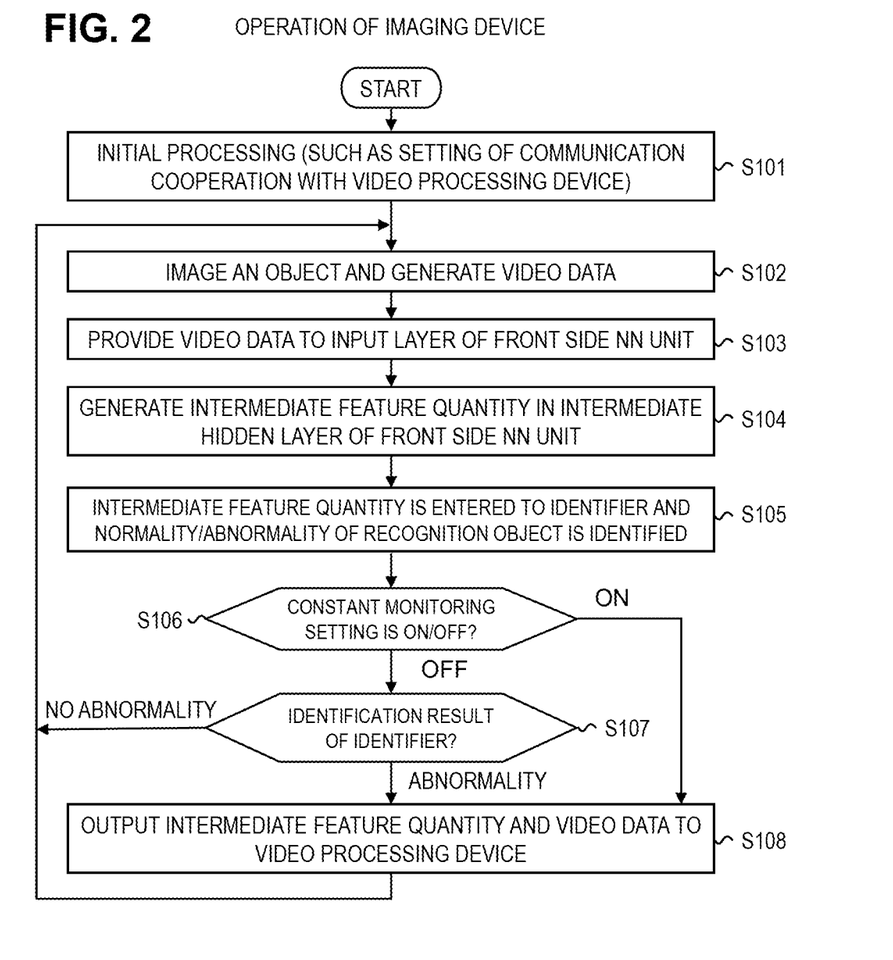
FIG. 2 is a flowchart illustrating an operation of an imaging device 200 according to the first embodiment.

FIG. 2 is a flowchart illustrating the operation of the imaging device 200 according to the first embodiment.

Hereafter, the operation will be described with reference to step numbers shown in FIG. 2.

Step S101: The imaging device 200 communicates with the video processing device 300 and performs initial processing regarding communication cooperation settings, imaging operation and other operations. For example, initial settings regarding whether the purpose of use requires video data and recognition results constantly (constant monitoring), such as in a monitoring system, is carried out from the video processing device 300 to the imaging device 200.

Step S102: The imaging element 210 images an object at a predetermined frame rate. The video processing unit 211 performs successive video processing of image output of the imaging element 210, and outputs video data that may include an object to be recognized as image.

Step S103: The video data output from the video processing unit 211 is entered successively to the input layer L1 of the front side NN unit 220.

Step S104: Processing by neural networks composed of the hidden layer HA1 to the intermediate hidden layer HAx is performed within the front side NN unit 220. In this step, a weight coefficient sequence W and a bias b which have been set according to a learning processing (described later) are set up for each node of each layer. These settings are used to perform product-sum operation to a node output of a former layer. Then, nonlinear processing using an activation function is performed sequentially to the product-sum operation value. As a result of the processing performed by the neural networks, an intermediate feature quantity composed of multiple node values is generated as a result of an intermediate feature detection of the video data in the intermediate hidden layer HAx of the front side NN unit 220.

Step S105: The intermediate feature quantity is entered to the identifier 231, and normality/abnormality of the intermediate feature quantity (and the original video data thereof) is identified. The identifier 231 outputs a degree of abnormality (likelihood indicating degree of abnormality) based on the identification result.

Step S106: Video data, intermediate feature quantity and degree of abnormality are entered to the transmission data selection unit 232. The transmission data selection unit 232 performs determination regarding the setting of constant monitoring described above (refer to step S101). In a state where the constant monitoring is set to on, the transmission data selection unit 232 advances the operation to step S108 to constantly transmit the video data and the intermediate feature quantity to the video processing device 300. Meanwhile, in a state where the constant monitoring is set to off, the transmission data selection unit 232 advances the operation to step S107 to send the video data and the intermediate feature quantity to the video processing device 300 only during abnormality.

Step S107: The transmission data selection unit 232 determines whether abnormality is detected or not based on the degree of abnormality of the identifier 231. If abnormality is detected in the intermediate feature quantity, the transmission data selection unit 232 advances the operation to step S108. Meanwhile, if there is no abnormality in the intermediate feature quantity, the transmission data selection unit 232 returns the operation to step S102, and the transmission data selection unit 232 will not output the intermediate feature quantity and the video data to the video processing device 300.

Step S108: The transmission data selection unit 232 sends the intermediate feature quantity and the video data being the source thereof to the video processing device 300. The transmission data selection unit 232 can also send the degree of abnormality to the video processing device 300. Thereafter, a series of operations illustrated in steps S102 to S108 are repeated in the imaging device 200.

(Operation of Video Processing Device 300 According to First Embodiment)

Figure 3:
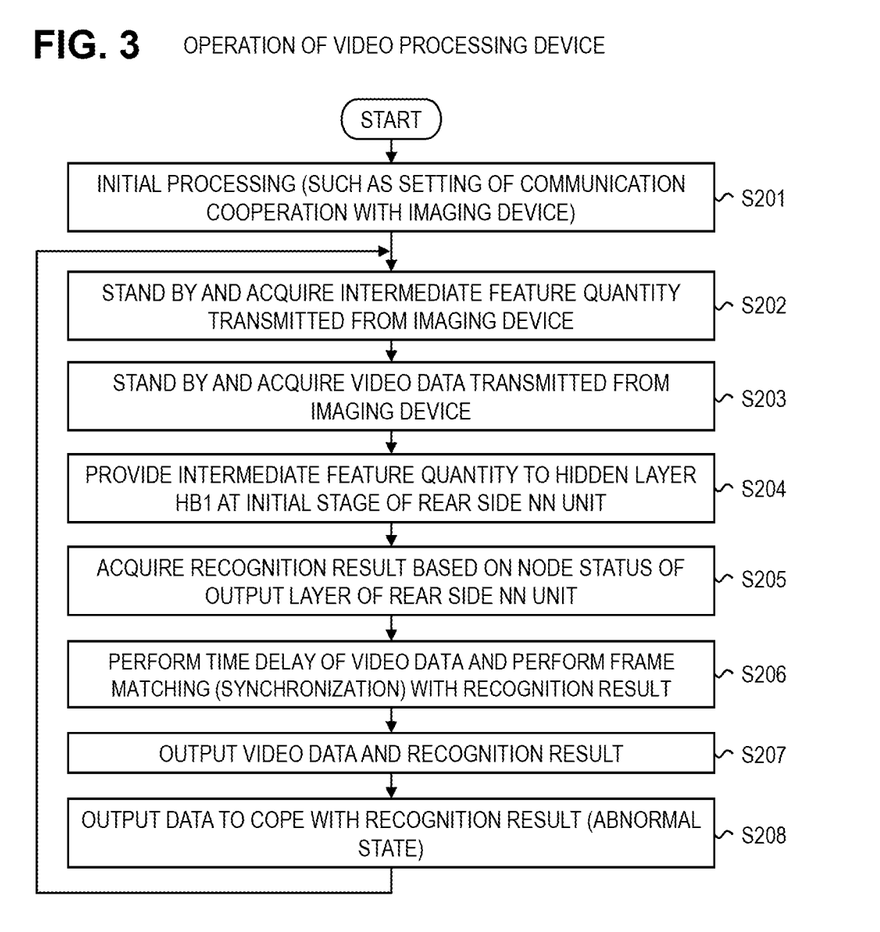
FIG. 3 is a flowchart illustrating an operation of a video processing device 300 according to the first embodiment.

FIG. 3 is a flowchart illustrating the operation of the video processing device 300 according to the first embodiment.

Hereafter, the operation will be described with reference to step numbers shown in FIG. 3.

Step S201: The video processing device 300 communicates with the imaging device 200 as described above (refer to step S101 of FIG. 2), and performs initial processing of the communication cooperation settings, the imaging operation and other operations.

Step S202: The video processing side control unit 310 of the video processing device 300 stands by and acquires the intermediate feature quantity transmitted from the imaging device 200. The video processing side control unit 310 can also acquire the degree of abnormality transmitted from the imaging device 200.

Step S203: The video processing side control unit 310 stands by and acquires the video data transmitted from the imaging device 200.

Step S204: The video processing side control unit 310 provides the acquired intermediate feature quantity to a hidden layer HB1 which is the initial stage of the rear side NN unit 320.

Step S205: Processing by the neural networks composed of the hidden layers HB1 to HBn is performed in the rear side NN unit 320. The weight coefficient sequence W and the bias b are set up for each node of the respective layers by the learning processing (described later). Product-sum operation regarding the node output of the former layer is performed using these settings. Nonlinear processing based on the activation function is sequentially performed to the product-sum operation. As a result of the processing performed by the neural networks, a recognition result regarding the video data is generated in the output layer L2 at the final stage of the rear side NN unit 320.

The recognition result in this step varies flexibly in response to the configuration of the neural networks and the learning processing thereof. For example, the recognition result of object discrimination illustrating the classification of the object contained in the video data by likelihood can be obtained by performing learning of labeling the classification of the object (such as whether the object is a harmful intruder or a harmless small animal if the purpose is monitoring). Further, for example, if learning to extract/identify the object area within the video data is performed in combination with the classification of the object, a recognition result capable of easily presenting the object area contained in the video data can be obtained.

Step S206: The recognition integration processing unit 330 performs time delay of video data and carries out frame matching (synchronization) with the recognition result.

Step S207: The recognition integration processing unit 330 outputs the video data and the recognition result to the exterior. The recognition integration processing unit 330 can also output the degree of abnormality generated in the imaging device 200 to the exterior.

Step S208: If the recognition result is an abnormal state, the recognition integration processing unit 330 outputs a corresponding control signal and the like to the exterior.

Thereafter, the video processing device 300 repeats the series of operations from steps S202 to S208.

(Effect of First Embodiment)

The first embodiment described above exerts the following effects.

(1) According to the first embodiment, the multiple layers of neural networks from the input layer L1 to the intermediate hidden layer HAx that perform the recognition processing of video data are provided as the front side NN unit 220 in the imaging device 200. Therefore, the imaging device 200 can generate and output an intermediate feature quantity, which is not quite a precise recognition result of the video data but an intermediate result thereof.

(2) According to the first embodiment, the video processing device 300 includes the remaining rear side NN unit 320. Unlike the system configuration of PTL 1, an extensive DNN or CNN can be realized by a simple and small-scale system configuration using the imaging device 200 and at least one video processing device 300.

(3) According to the first embodiment, the entire neural networks that function as a single unit are arranged in a manner dispersed between the imaging device 200 and the video processing device 300. Therefore, the processing load by the entire neural networks can be shared between the imaging device 200 and the video processing device 300. Accordingly, issues such as power consumption, heat generation and processing time of the entire neural networks can be shared in a well-balanced manner between the imaging device 200 and the video processing device 300.

(4) According to the first embodiment, the identifier 231 for identifying abnormality based on the intermediate feature quantity is provided. The intermediate feature quantity is an intermediate procedure of the recognition processing. Therefore, amount of information regarding recognition is significantly narrowed compared to the video data containing a large amount of redundant information. Accordingly, abnormality can be identified more appropriately by identifying abnormality based on the intermediate feature quantity in which the amount of information related to recognition is narrowed compared to identifying abnormality based on the redundant video data.

(5) According to the first embodiment, if the identifier 231 identifies abnormality, the intermediate feature quantity is transmitted to the video processing device 300, and if the identifier 231 identifies no abnormality, the intermediate feature quantity is not transmitted to the video processing device 300 (refer to step S107 of FIG. 2). Therefore, in a non-essential state of no abnormality, the rear side NN unit 320 of the video processing device 300 can be brought to a halt, and the power consumption, the heat generation and the processing time of the entire neural networks can be reduced even further.

(6) According to the first embodiment, if the identifier 231 identifies abnormality, the video data is transmitted to the video processing device 300, and if the identifier 231 identifies no abnormality, the video data is not transmitted to the video processing device 300 (refer to step S107 of FIG. 2). Therefore, in a non-essential state of no abnormality, the recognition integration processing unit 330 of the video processing device 300 can be brought to a halt, and the power consumption, the heating generation and the processing time of the entire video system 100 can be reduced even further.

(7) Generally, the imaging device for inspection or for monitoring is small in size, so it is difficult to implement the entire neural networks which is complex and extensive thereto from the viewpoint of circuit scale, power consumption and heat generation. However, according to the first embodiment, only a part of the neural networks (the front side NN unit 220) is implemented in the imaging device 200, so that limitations regarding circuit scale, power consumption and heat generation can be solved easily.

(8) Generally, a large number of imaging devices 200 can be connected simultaneously to one video processing device 300. In this case, the video processing device 300 must perform high-speed processing of a large amount of video data transmitted from the large number of imaging devices 200, and the processing load becomes excessive. In this state, it is difficult to implement the entire neural networks which is complex and extensive to the video processing device 300 from the viewpoint of processing speed, circuit scale, power consumption and heat generation. However, according to the first embodiment, only a part of the neural networks (the rear side NN unit 320) is to be implemented in the video processing device, and if the identifier 231 identifies no abnormality, the intermediate feature quantity will not be transmitted to the video processing device 300 (refer to step S107 of FIG. 2), so that limitations regarding processing speed, circuit scale, power consumption and heat generation can be solved easily.

Second Embodiment

Next, a second embodiment having a learning function and a node allocation function added thereto will be described.

(Configuration of Second Embodiment)

Figure 4:
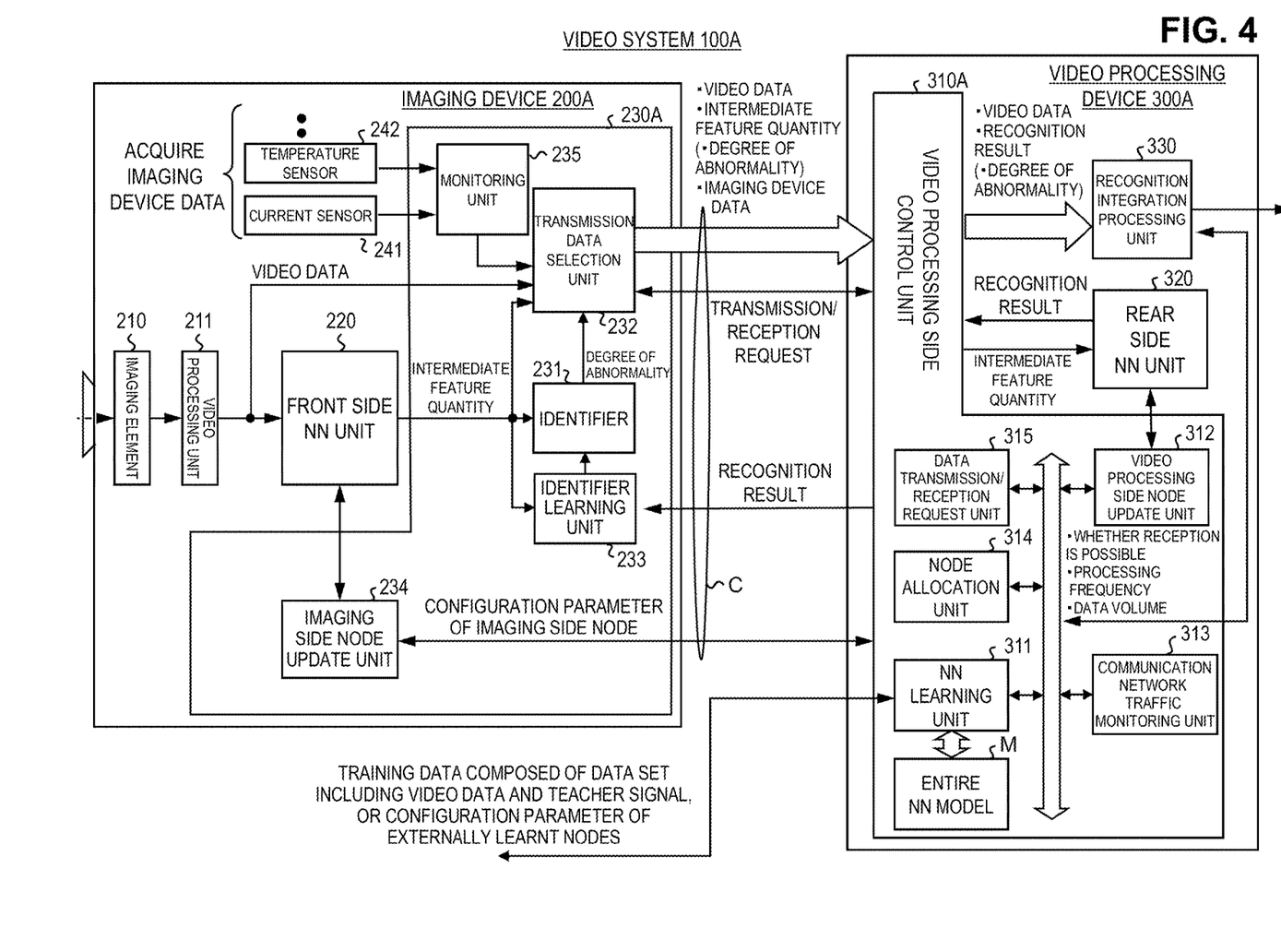
FIG. 4 is a block diagram illustrating a configuration of a video system according to a second embodiment.

FIG. 4 is a block diagram illustrating a configuration of a video system according to a second embodiment.

Description of a configuration equivalent to the configuration of the first embodiment (refer to FIG. 1) will be omitted.

A video system 100A is configured by connecting an imaging device 200A and a video processing device 300A to allow communication via a communication network C (such as a dedicated cable, a wireless network or other networks).

An imaging side control unit 230A of the imaging device 200A further includes an identifier learning unit 233, an imaging side node update unit 234 and a monitoring unit 235.

The identifier learning unit 233 performs learning of the identifier 231 based on the intermediate feature quantity and the recognition result of the rear side NN unit 320. The identifier learning unit 233 can also be arranged on the video processing device 300A side.

The imaging side node update unit 234 updates the node allocation and node configuration parameter of the front side NN unit 220.

The monitoring unit 235 acquires imaging device data from a group of sensors of the imaging device 200A such as a current sensor 241 or a temperature sensor 242, and outputs the same to the transmission data selection unit 232. The current sensor 241 monitors a current quantity of an area where the current quantity increases or decreases in response to the processing load or an area where the current quantity may reach the upper limit in the imaging device 200A. Further, the temperature sensor 242 monitors a temperature of an area where the temperature rises in response to the processing load or an area where the temperature may reach the upper limit in the imaging device 200A.

Meanwhile, the video processing side control unit 310A of the video processing device 300A further includes an NN learning unit 311, a video processing side node update unit 312, a communication network traffic monitoring unit 313, a node allocation unit 314, and a data transmission/reception request unit 315. The node allocation unit 314 can be provided in the imaging side control unit 230A.

The NN learning unit 311 is equipped with an entire NN model M. For example, the entire NN model M is a mathematical model on a program and composed of an operation module such as an array operation. The NN learning unit 311 uses a training data composed of a data set including video data and teacher signal to perform learning processing regarding the entire NN model M (such as a back propagation method), and determines the configuration parameter of each node of the entire NN model M.

Further, the NN learning unit 311 can acquire the configuration parameter of an externally learnt node instead of carrying out the learning process of the entire NN model M.

The video processing side node update unit 312 updates the node allocation and node configuration parameter of the rear side NN unit 320.

The communication network traffic monitoring unit 313 monitors a communication traffic between the imaging device 200A and the video processing device 300A.

The node allocation unit 314 changes the allocation of the number of nodes (or number of layers) of the front side NN unit 220 and the number of nodes (or number of layers) of the rear side NN unit 320 according to the load status of the imaging device 200A and the video processing device 300A.

The data transmission/reception request unit 315 performs request processing and buffer processing regarding various transmissions and receptions carried out between the imaging side control unit 230A and the video processing side control unit 310A.

Further, information regarding whether reception is possible, processing frequency and data volume is entered to the internal function of the video processing side control unit 310A from the recognition integration processing unit 330.

(Configuration of Entire NN Model M)

Figure 5:
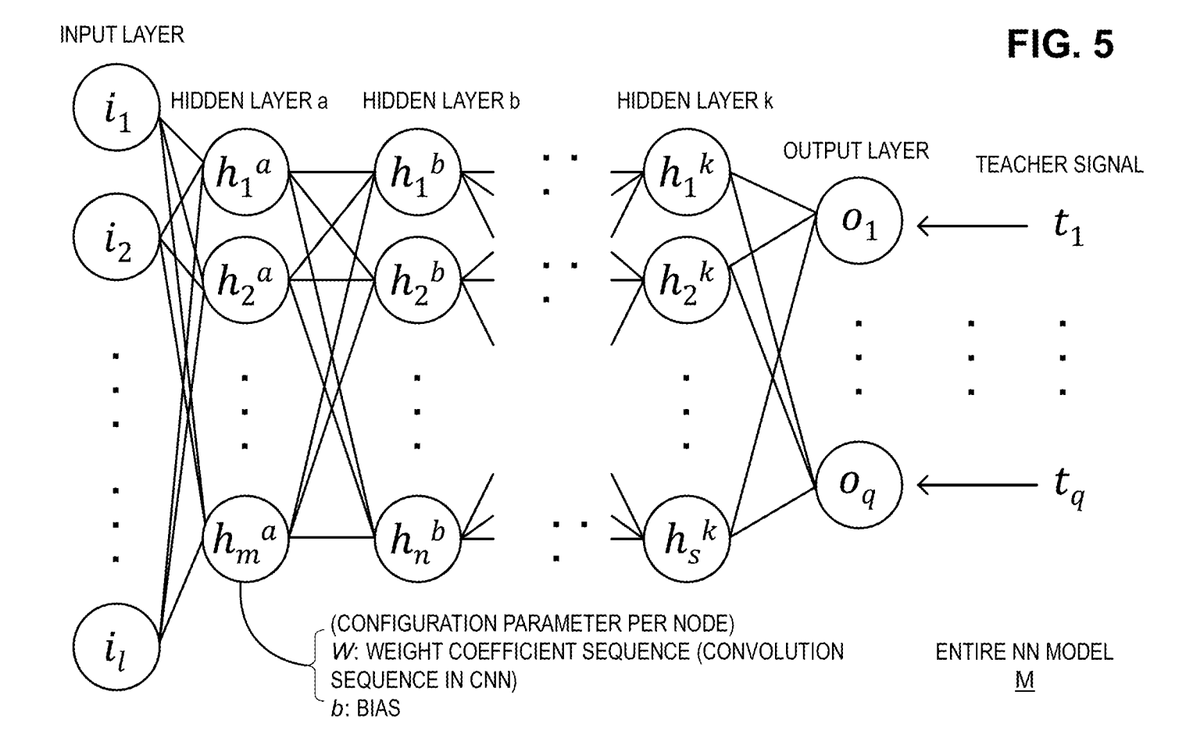
FIG. 5 is a view illustrating an entire NN model M according to the second embodiment.

FIG. 5 is a view illustrating an entire NN model M configured of DNNs.

The node configuration of the entire NN model M is set identically as the node configuration of the entire neural networks having integrated the front side NN unit 220 and the rear side NN unit 320.

The DNNs include a group of nodes of the input layer, a group of nodes of the plurality of hidden layers and a group of nodes of the output layer, each of which being set with the weight coefficient sequence W and the bias b indicating combined load between nodes.

A pixel value of the video data is entered to the group of nodes of the input layer. The nodes of the hidden layer and the output layer perform a product-sum operation of the values of each node of the former layer by the weight coefficient sequence W and the bias b, and output a value processed by an activation function such as a sigmoid function or a ReLU function as the node value.

The output layer as the final stage outputs a recognition result value (likelihood) by a processing using a Softmax function and the like.

(Operation of NN Learning Unit 311)

Next, learning of the front side NN unit 220 and the rear side NN unit 320 will be described.

Figure 6:
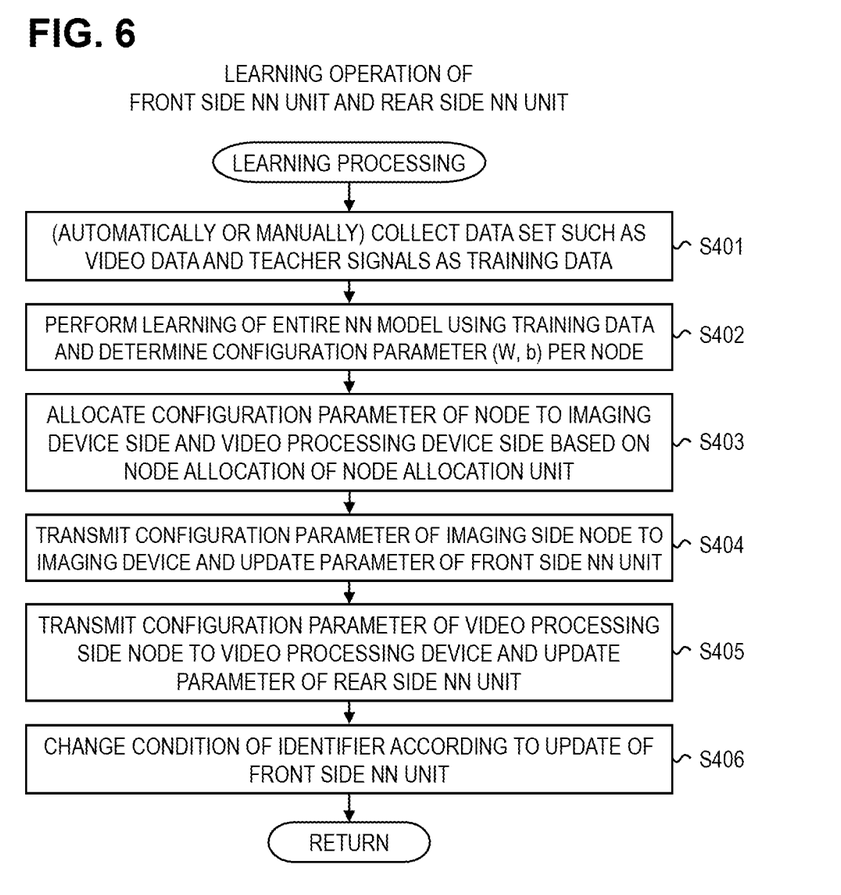
FIG. 6 is a flowchart illustrating an operation of the NN learning unit 311 according to the second embodiment.

FIG. 6 is a flowchart illustrating an operation of the NN learning unit 311.

Hereafter, the operation will be described with reference to step numbers shown in the drawing.

Step S401: The NN learning unit 311 collects the data set such as video data and teacher signals as training data either automatically or manually.

Step S402: The NN learning unit 311 performs learning of the entire NN model M using training data and determines the configuration parameters (weight coefficient sequence W and bias b) of the nodes.

Step S403: The NN learning unit 311 allocates the configuration parameters of the nodes to the imaging device 200A and the video processing device 300A based on the node allocation of the node allocation unit 314.

Step S404: The NN learning unit 311 transmits the configuration parameters of the nodes allocated to the imaging device 200A via the data transmission/reception request unit to the imaging side node update unit 234 in the imaging device 200A. The imaging side node update unit 234 updates the parameters of the front side NN unit 220 using the received configuration parameters. Thereby, the learning processing of the front side NN unit 220 is completed.

Step S405: The NN learning unit 311 transmits the configuration parameters of the nodes allocated to the video processing device 300A via the video processing side node update unit 312. The video processing side node update unit 312 updates the parameters of the rear side NN unit 320 using the received configuration parameters. Thereby, the learning processing of the rear side NN unit 320 is completed.

Step S406: Since the parameters of the front side NN unit 220 are updated, the intermediate feature quantity output from the front side NN unit 220 is renewed. Therefore, the conditions of the identification processing of the identifier 231 are changed to correspond to the new intermediate feature quantity.

(Operation of Node Distribution Unit 314)

Next, a processing of changing the node allocation (position of the intermediate hidden layer) between the front side NN unit 220 and the rear side NN unit 320 will be described.

Figure 7:
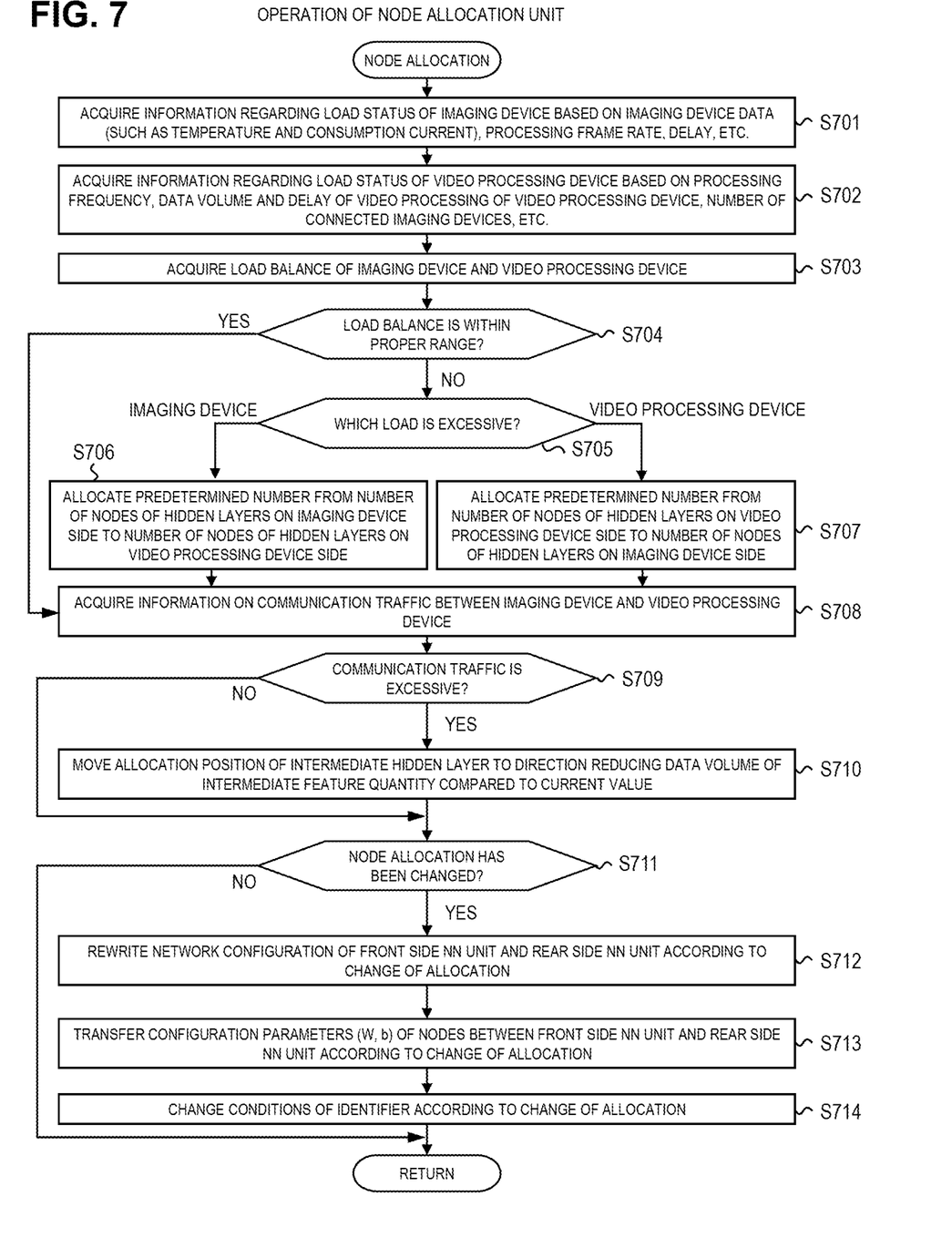
FIG. 7 is a flowchart illustrating an operation of a node allocation unit 314 according to the second embodiment.

FIG. 7 is a flowchart illustrating the operation of the node allocation unit 314.

Hereafter, the operation will be described with reference to the step numbers shown in the drawing.

Step S701: The node allocation unit 314 acquires information on the load status of the imaging device 200A based on the imaging device data (such as temperature and consumption current) output from the monitoring unit 235 or processing frame rate and delay of the front side NN unit 220.

Step S702: The node allocation unit 314 acquires information on the load status of the video processing device 300A based on the processing frequency and data volume of the video processing device 300A, the delay of the video processing, or the number of connected imaging devices.

Step S703: Based on the load status of the imaging device 200A and the load status of the video processing device 300A, the node allocation unit 314 acquires the load balance between the devices.

Step S704: The node allocation unit 314 determines whether the current load balance is within a proper range. If it is within the proper range, the node allocation unit 314 advances the operation to step S708. If it is not within the proper range, the node allocation unit 314 advances the operation to step S705.

Step S705: The node allocation unit 314 determines whether the load status of one side is excessive over the other. If the load status of the imaging device 200A is excessive, the node allocation unit 314 advances the operation to step S706. In contrast, if the load status of the video processing device 300A is excessive, the node allocation unit 314 advances the operation to step S707.

Step S706: The node allocation unit 314 allocates a predetermined number from the number of nodes (number of layers) of the hidden layers of the front side NN unit 220 to the number of nodes (number of layers) of the hidden layers of the rear side NN unit 320. After this operation, the node allocation unit 314 advances the operation to step S708.

Step S707: The node allocation unit 314 allocates a predetermined number from the number of nodes (number of layers) of the hidden layers of the rear side NN unit 320 to the number of nodes (number of layers) of hidden layers of the front side NN unit 220.

Step S708: The node allocation unit 314 acquires information on communication traffic between the imaging device 200A and the video processing device 300A from the communication network traffic monitoring unit 313. The communication traffic varies according to the number of connected imaging devices or the amount and the frequency of information entered from the imaging devices.

Step S709: The node allocation unit 314 determines whether the communication traffic is excessive. If the communication traffic is excessive, the node allocation unit 314 advances the operation to step S710.

If there is sufficient margin for communication traffic, the node allocation unit 314 advances the operation to step S711.

Step S710: The data volume of the intermediate feature quantity output from the imaging device 200A to the video processing device 300A varies according to the number of nodes of the intermediate hidden layer HAx and the frequencies thereof. Therefore, the node allocation unit 314 transfers the allocation position of the intermediate hidden layer to a direction toward which the data volume (such as the number of nodes of the intermediate hidden layer multiplied by transmission frequency) is reduced compared to the current data volume.

Step S711: The node allocation unit 314 determines in steps S706 to S710 whether the node allocation has been changed. If the node allocation has been changed, the node allocation unit 314 advances the operation to step S712. Meanwhile, if the node allocation has not been changed, the node allocation operation is completed.

Step S712: The imaging side node update unit 234 rewrites the network configuration of the front side NN unit 220 according to the change of node allocation. Further, the video processing side node update unit 312 rewrites the network configuration of the rear side NN unit 320 according to the change of node allocation.

Step S713: According to the change of node allocation, configuration parameters (W, b) of nodes are transferred between the front side NN unit 220 and the rear side NN unit 320.

Step S714: Since the number of nodes of the front side NN unit 220 increases or decreases and the position of the intermediate hidden layer HAx is moved, the intermediate feature quantity output from the front side NN unit 220 is varied. Thus, the identifier learning unit 233 changes the conditions of identification processing of the identifier 231 to match the new intermediate feature quantity. Therefore, it is preferable for the identifier 231 to learn conditions (parameters) in advance for each of the intermediate feature quantities output by the respective hidden layers that may be set as the intermediate hidden layer.

According to the series of processing described above, node allocation is changed flexibly between the front side NN unit 220 and the rear side NN unit 320 in response to the load status and the like.

(Effect of Second Embodiment)

The second embodiment exerts the following effects in addition to the effects of the first embodiment.

(1) The second embodiment is equipped with the identifier learning unit 233 that performs learning (such as changing of condition of identification processing) of the identifier 231 based on the intermediate feature quantity of the front side NN unit 220 and the processing result of the rear side NN unit 320. Therefore, if the node allocation or the configuration parameter of the front side NN unit 220 has been changed, learning of the identifier 231 can be performed at any time in response thereto.

(2) The second embodiment is equipped with the NN learning unit 311. Therefore, learning processing for the front side NN unit 220 and the rear side NN unit 320 can be performed in the video system 100A.

(3) The second embodiment is equipped with the entire NN model M. Therefore, there is no need to communicate a large amount of data for learning processing between the divided front side NN unit 220 and the rear side NN unit 320, and the time required for the learning processing can be cut down.

(4) The second embodiment communicates the configuration parameters of the nodes being transferred in response to the allocation of the number of nodes between the front side NN unit 220 and the rear side NN unit 320. Therefore, there is no need to perform the learning processing for the front side NN unit 220 and the rear side NN unit 320 again from the start, and the excessive calculation load and calculation time regarding the learning processing can be omitted.

(5) According to the second embodiment, the node allocation unit 314 acquires the load status of the imaging device 200A or the video processing device 300A and changes the allocation of the number of nodes of the front side NN unit 220 and the number of nodes of the rear side NN unit 320 according to the load status. Therefore, the load of the imaging device 200A or the video processing device 300A can be adjusted suitably.

(6) According to the second embodiment, the node allocation unit 314 reduces the number of nodes of the front side NN unit 220 in response to the rising of temperature of the imaging device 200A. As a result, power consumption of the front side NN unit 220 can be suppressed and rising of temperature thereof can be controlled.

(7) According to the second embodiment, the node allocation unit 314 reduces the number of nodes of the front side NN unit 220 in response to the rising of consumption current of the imaging device 200A. As a result, current consumption of the front side NN unit 220 can be suppressed and saving of energy of the imaging device 200A can be realized.

(8) According to the second embodiment, the node allocation unit 314 reduces the number of nodes of the front side NN unit 220 in response to the deterioration of processing frame rate of the imaging device 200A. As a result, processing delay of the front side NN unit 220 can be improved and the operation of the imaging device 200A can be smoothed.

(9) According to the second embodiment, the node allocation unit 314 changes the allocation of the number of nodes of the front side NN unit 220 and the number of nodes of the rear side NN unit 320 based on the relative load balance between the imaging device 200A and the video processing device 300A. Therefore, an unbalanced situation where the improvement of the load status of one device causes deterioration of the load status of the other device rarely occurs.

(10) According to the second embodiment, the amount of information being communicated as the intermediate feature quantity can be cut down by the node allocation unit 314 moving the position of the intermediate hidden layer toward a direction to reduce the product of the number of nodes of the intermediate hidden layer and the estimated transmission frequency of the intermediate feature quantity.

(11) According to the second embodiment, information regarding communication traffic that varies according to the number of imaging devices being connected, the amount of information entered from the imaging devices and the frequency thereof is acquired, and if the communication traffic is excessive, the position of the intermediate hidden layer is moved toward a direction to reduce the amount of information being communicated regarding the intermediate feature quantity output from the intermediate hidden layer. Thereby, the communication traffic can be reduced.

Third Embodiment

Next, an inspection system that adopts the video system according to the present invention with the aim to automate inspection in a factory and the like will be described.

Figure 8:
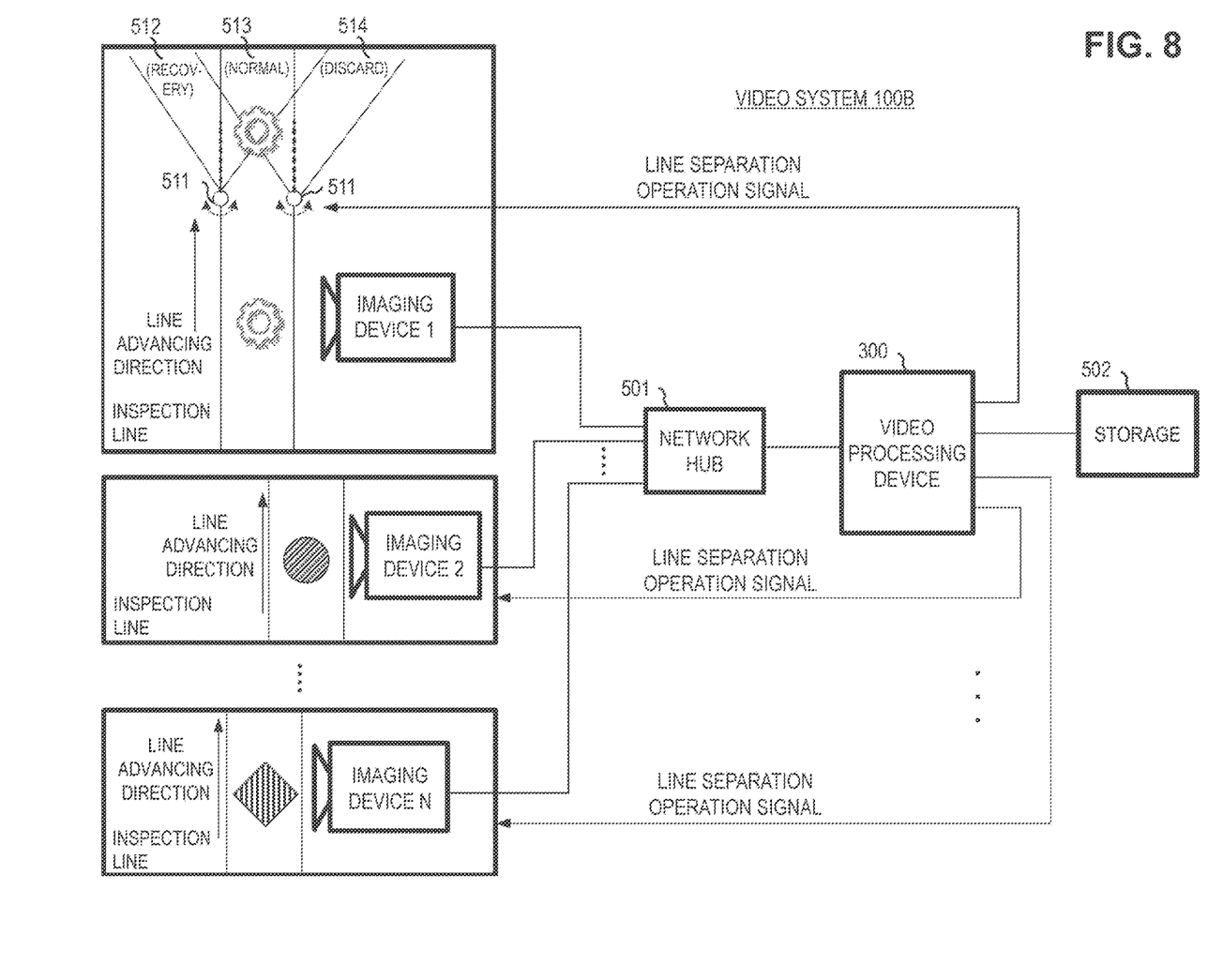
FIG. 8 is a diagram illustrating an inspection system (including a video system) according to a third embodiment.

FIG. 8 is a diagram illustrating an inspection system (including a video system) according to a third embodiment.

In the drawing, imaging devices 1, 2 . . . N are arranged on each of a plurality of inspection lines. These imaging devices 1, 2 . . . N are connected via a network hub 501 to the video processing device 300 and a storage 502. A line separation operation signal is transmitted to each of the inspection lines from the video processing device 300.

Each imaging device calculates a degree of abnormality based on the intermediate feature quantity each time a new inspection object passes before the imaging device. The degree of abnormality is computed based on a statistical outlier and the like, so that in an environment where much of the inspection objects is a normal object and the background does not change easily, a preferable accuracy can be achieved even by using an identifier based on a relatively simple method.

It is assumed that the front side NN units (not shown) within the imaging devices 1, 2 . . . N and the rear side NN unit (not shown) within the video processing device 300 have collected the data sets of video data and teacher signals corresponding to the actual environment prior to practical use, and that configuration parameters that have been determined as learned using the aforementioned data have been adopted.

Now, as a simple example, three identification classes of neural networks composed of the front side NN unit and the rear side NN unit are set, which are class 1: "normal", class 2: "presence of recoverable flaw or defect", and class 3: "presence of irreparable flaw or defect".

As a result of calculation of the degree of abnormality, if it is determined that there is a high possibility of abnormality in the object having passed before the imaging device 1, a request for transmitting data to the video processing device 300 is issued via the network hub 501.

In this state, if there is abnormality in another inspection line at the same time and recognition processing is ongoing in the video processing device 300, data is saved in a buffer such as a frame buffer and the data is in stand-by for transmission.

If only data having a buffer size corresponding to one object data can be stored, the recognition processing at the video processing device 300 must be completed sufficiently earlier than the passing of the next object before the imaging device. If recognition processing is not performed in the video processing device 300, a signal requesting data is returned to the imaging device 1, so that after receiving the signal, the data is transmitted to the video processing device 300. In the video processing device 300, recognition processing is performed based on the received data, and identification of the aforementioned classes 1 to 3 is performed. If it is determined as class 1 "normal", the object is transmitted together with the other normal products to a normal product lane 513, and if it is determined as class 2 ""presence of recoverable flaw or defect", a line separation rail 511 is started based on the line separation operation signal, and the object is transferred to a recovery lane 512 where the object is subjected to a proper repair operation. If it is determined as class 3: "presence of irreparable flaw or defect", the object is transferred to a discarding lane 514 based on the line separation operation signal and discarded as it is. The data received by the video processing device 300 is saved in the storage 502, and if necessary, it can be referred to as reference information for repairing, used as data for confirming identification accuracy, or as data used for learning.

Further, it is possible to vary the boundary position of the hidden layer in the imaging devices and the video processing device 300 based on the traffic of the network or the temperature of the surrounding environment as mentioned earlier, and if it is necessary to improve the recognition accuracy, data update of the entire neural networks can be performed, but these operations should preferably be performed while the line is brought to a halt, or if there is a certain period of time between one lot and another lot of objects, they should be performed during that period of time.

(Supplementary Item of Present Embodiment)

The present invention is not limited to the respective embodiments described above, and various modifications are possible. For example, the above-mentioned embodiments are described in detail for better understanding of the present invention, and they are not intended to limit the scope of the invention to a configuration including all the components described above.

A portion of a configuration of a certain embodiment can be replaced with a configuration of another embodiment, or a configuration of a certain embodiment can be added to a configuration of another embodiment.

Further, adding, deleting or replacing a part of a configuration of an embodiment to, from or with another configuration is possible.

In the second embodiment, a case where the video processing device 300A includes the NN learning unit 311 has been described. However, the present invention is not limited thereto. It is assumed that the performance of the video processing device 300A is limited, so that the NN learning unit 311 can be disposed outside the video processing device 300A (such as in another computer or a server).

In the present embodiment, a DNN format is adopted in the front side NN unit and the rear side NN unit. However, the present invention is not limited to a certain type of machine learning. For example, a CNN format can be adopted in the front side NN unit and the rear side NN unit. In that case, a convolutional layer, a pooling layer or a combination thereof can be suitably adopted to a part of or all the hidden layers.

Further according to the present embodiment, supervised learning has been described. However, the present invention is not limited thereto. For example, the invention can adopt unsupervised learning.

Further according to the present embodiment, video signals and recognition results are integrated in the recognition integration processing unit 330, but the present invention is not limited thereto. For example, if the data volume is to be reduced, the following stepwise output processing can be performed.

(1) At first, the degree of abnormality is acquired at the imaging device side;

(2) if the degree of abnormality is a value equal to or greater than a threshold that requires recognition at the video processing device side, only the intermediate feature quantity is transmitted;

(3) the intermediate features quantity is received as input by the video processing device, and determination is performed on whether the video data is truly abnormal, and the type of abnormality, if any;

(4) if saving or observing of video data or the degree of abnormality thereof is necessary, the acquisition of relevant data stored in the buffer on the imaging device side is requested; and (5) in response to the request, the imaging device transmits data to the video processing device.

REFERENCE SIGNS LIST

HAx: intermediate hidden layer, L1: input layer, 100: video system, 100A: video system, 200: imaging device, 200A: imaging device, 210: imaging element, 211: video processing unit, 220: front side NN unit, 230: imaging side control unit, 231: identifier, 232: transmission data selection unit, 233: identifier learning unit, 234: imaging side node update unit, 235: monitoring unit, 241: current sensor, 242: temperature sensor, 300: video processing device, 300A: video processing device, 310: video processing side control unit, 310A: video processing side control unit, 311: NN learning unit, 312: video processing side node update unit, 313: communication network traffic monitoring unit, 314: node allocation unit, 315: data transmission/reception request unit, 320: rear side NN unit, 330: recognition integration processing unit, 501: network hub, 502: storage, 511: line separation rail, 512: recovery lane, 513: normal product lane, 514: discarding lane

The invention claimed is:

1. A video system comprising an imaging device and a video processing device, wherein
the imaging device comprises:
an imaging unit configured to generate video data by imaging;
a front side NN unit comprising multiple layers of neural networks from an input layer to a predetermined intermediate hidden layer (hereinafter referred to as "intermediate hidden layer") that are configured to perform recognition processing of the video data; and
an imaging side control unit configured to transmit an output of the intermediate hidden layer of the front side NN unit (hereinafter referred to as "intermediate feature quantity") comprising an identifier configured to identify abnormality according to the intermediate feature quantity, and a transmission data selection unit configured to not output the intermediate feature quantity to the video processing device in a case where the identifier identifies that there is no abnormality, and the video processing device comprises:
a video processing side control unit configured to acquire the intermediate feature quantity transmitted from the imaging side control unit; and
a rear side NN unit comprising the multiple layers of the neural networks from a layer subsequent the intermediate hidden layer to an output layer, the rear side NN unit configured to perform a remaining recognition processing regarding the intermediate feature quantity acquired by the video processing side control unit.

2. The video system according to claim 1, wherein the transmission data selection unit is configured not to output the video data to the video processing device in a case where the identifier identifies that there is no abnormality.

3. The video system according to claim 1, wherein at least one of the imaging side control unit and the video processing side control unit comprises
an identifier learning unit configured to perform learning of the identifier based on the intermediate feature quantity and a processing result of the rear side NN unit.

4. The video system according to claim 2, wherein at least one of the imaging side control unit and the video processing side control unit comprises
an identifier learning unit configured to perform learning of the identifier based on the intermediate feature quantity and a processing result of the rear side NN unit.

5. A video system comprising an imaging device and a video processing device, wherein
the imaging device comprises:
an imaging unit configured to generate video data by imaging;
a front side NN unit comprising multiple layers of neural networks from an input layer to a predetermined intermediate hidden layer (hereinafter referred to as "intermediate hidden layer") that are configured to perform recognition processing of the video data; and
an imaging side control unit configured to transmit an output of the intermediate hidden layer of the front side NN unit (hereinafter referred to as "intermediate feature quantity"), and
the video processing device comprises:
a video processing side control unit configured to acquire the intermediate feature quantity transmitted from the imaging side control unit; and
a rear side NN unit comprising the multiple layers of the neural networks from a layer subsequent the intermediate hidden layer to an output layer, the rear side NN unit configured to perform a remaining recognition processing regarding the intermediate feature quantity acquired by the video processing side control unit, and
the video processing device or an exterior thereof comprises:
an entire NN model configured to implement an entire node of the neural networks, and
an NN learning unit configured to perform a learning processing with respect to the entire NN model and determine a configuration parameter of each node of the entire NN model,
the imaging side control unit is configured to
acquire the configuration parameter corresponding to each node of the front side NN unit from the NN learning unit and set the same to each node of the front side NN unit, and
the video processing side control unit is configured to acquire the configuration parameter corresponding to each node of the rear side NN unit from the NN learning unit and set the same to each node of the rear side NN unit.

6. The video system according to claim 5, wherein at least one of the imaging side control unit and the video processing side control unit comprises:
a node allocation unit configured to change allocation of a number of nodes of the front side NN unit and a number of nodes of the rear side NN unit, and
wherein the front side NN unit and the rear side NN unit communicates a configuration parameter of a node being transferred according to the allocation of the number of nodes being changed by the node allocation unit.

7. The video system according to claim 6, wherein the node allocation unit is configured to acquire a load status of the imaging device or the video processing device and change the allocation of the number of nodes of the front side NN unit and the number of nodes of the rear side NN unit in response to the load status.

8. A video system comprising an imaging device and a video processing device, wherein
the imaging device comprises:
an imaging unit configured to generate video data by imaging;
a front side NN unit comprising multiple layers of neural networks from an input layer to a predetermined intermediate hidden layer (hereinafter referred to as "intermediate hidden layer") that are configured to perform recognition processing of the video data; and
an imaging side control unit configured to transmit an output of the intermediate hidden layer of the front side NN unit (hereinafter referred to as "intermediate feature quantity"), and
the video processing device comprises:
a video processing side control unit configured to acquire the intermediate feature quantity transmitted from the imaging side control unit; and
a rear side NN unit comprising the multiple layers of the neural networks from a layer subsequent the intermediate hidden layer to an output layer, the rear side NN unit configured to perform a remaining recognition processing regarding the intermediate feature quantity acquired by the video processing side control unit, and
at least one of the imaging side control unit and the video processing side control unit comprises
a node allocation unit configured to change allocation of a number of nodes of the front side NN unit and a number of nodes of the rear side NN unit, and
wherein the front side NN unit and the rear side NN unit communicates a configuration parameter of a node being transferred according to the allocation of the number of nodes being changed by the node allocation unit.

9. The video system according to claim 8, wherein the node allocation unit is configured to acquire a load status of the imaging device or the video processing device and change the allocation of the number of nodes of the front side NN unit and the number of nodes of the rear side NN unit in response to the load status.

10. The video system according to claim 9, wherein
a relative load balance between the imaging device and the video processing device is acquired, wherein in a state where a load of the imaging device is increased, a large number of nodes is allocated to the rear side NN unit, and in a state where a load of the video processing device is increased, a large number of nodes is allocated to the front side NN unit.

11. The video system according to claim 10, wherein the node allocation unit is configured to move a position of the intermediate hidden layer in a direction to reduce a product of the number of nodes of the intermediate hidden layer and a transmission frequency of the intermediate feature quantity to thereby cut down an amount of communicated information of the intermediate feature quantity.

12. The video system according to claim 10, wherein the node allocation unit is configured to
acquire information regarding a communication traffic that varies according to a number of imaging devices connected to the video processing device, an amount of information entered from the imaging devices and a frequency thereof, and
in a state where the communication traffic is excessive, move a position of the intermediate hidden layer toward a direction to reduce a product of the number of nodes of the intermediate hidden layer and a transmission frequency of the intermediate feature quantity to thereby reduce the amount of communicated information of the intermediate feature quantity.

13. The video system according to claim 9, wherein the node allocation unit is configured to move a position of the intermediate hidden layer in a direction to reduce a product of the number of nodes of the intermediate hidden layer and a transmission frequency of the intermediate feature quantity to thereby cut down an amount of communicated information of the intermediate feature quantity.

14. The video system according to claim 9, wherein the node allocation unit is configured to
acquire information regarding a communication traffic that varies according to a number of imaging devices connected to the video processing device, an amount of information entered from the imaging devices and a frequency thereof, and
in a state where the communication traffic is excessive, move a position of the intermediate hidden layer toward a direction to reduce a product of the number of nodes of the intermediate hidden layer and a transmission frequency of the intermediate feature quantity to thereby reduce the amount of communicated information of the intermediate feature quantity.

15. The video system according to claim 8, wherein the node allocation unit is configured to acquire a load status of the imaging device based on at least one of a group consisting of temperature detection, current detection, video processing delay, and change of processing frame rate.

16. The video system according to claim 8, wherein
a relative load balance between the imaging device and the video processing device is acquired, wherein in a state where a load of the imaging device is increased, a large number of nodes is allocated to the rear side NN unit, and in a state where a load of the video processing device is increased, a large number of nodes is allocated to the front side NN unit.

17. The video system according to claim 16, wherein the node allocation unit is configured to move a position of the intermediate hidden layer in a direction to reduce a product of the number of nodes of the intermediate hidden layer and a transmission frequency of the intermediate feature quantity to thereby cut down an amount of communicated information of the intermediate feature quantity.

18. The video system according to claim 16, wherein the node allocation unit is configured to
acquire information regarding a communication traffic that varies according to a number of imaging devices connected to the video processing device, an amount of information entered from the imaging devices and a frequency thereof, and
in a state where the communication traffic is excessive, move a position of the intermediate hidden layer toward a direction to reduce a product of the number of nodes of the intermediate hidden layer and a transmission frequency of the intermediate feature quantity to thereby reduce the amount of communicated information of the intermediate feature quantity.

19. The video system according to claim 8, wherein the node allocation unit is configured to move a position of the intermediate hidden layer in a direction to reduce a product of the number of nodes of the intermediate hidden layer and a transmission frequency of the intermediate feature quantity to thereby cut down an amount of communicated information of the intermediate feature quantity.

20. The video system according to claim 8, wherein the node allocation unit is configured to
acquire information regarding a communication traffic that varies according to a number of imaging devices connected to the video processing device, an amount of information entered from the imaging devices and a frequency thereof, and
in a state where the communication traffic is excessive, move a position of the intermediate hidden layer toward a direction to reduce a product of the number of nodes of the intermediate hidden layer and a transmission frequency of the intermediate feature quantity to thereby reduce the amount of communicated information of the intermediate feature quantity.

* * * * *